United States Patent

Pankratz et al.

Patent Number: 6,114,021
Date of Patent: Sep. 5, 2000

[54] PRIMED POLYMER FILMS HAVING IMPROVED ADHESION CHARACTERISTICS AND PROCESSES FOR MAKING THE FILMS

[75] Inventors: Richard Paul Pankratz, Circleville, Ohio; Clifford Cheng-Shiou Chang, Midlothian, Va.; Marc Bandman, Hilliard, Ohio

[73] Assignee: E. I. du Pont de Nemours and Company, Wilmington, Del.

[21] Appl. No.: 08/683,548

[22] Filed: Jul. 16, 1996

[51] Int. Cl.⁷ .............................. B32B 15/08; B32B 27/36
[52] U.S. Cl. ..................... 428/214; 428/461; 428/483; 428/500; 428/515; 428/910; 428/423.7
[58] Field of Search .......................... 428/3, 476.3, 910, 428/461, 483, 500, 515, 514, 475.8, 214, 423.7

[56] References Cited

U.S. PATENT DOCUMENTS

| | | | |
|---|---|---|---|
| 4,066,820 | 1/1978 | Kelly et al. | 428/483 |
| 4,098,952 | 7/1978 | Kelly et al. | 428/483 |
| 4,148,972 | 4/1979 | Yamane et al. | 428/515 |
| 4,362,775 | 12/1982 | Yabe et al. | 428/213 |
| 4,476,189 | 10/1984 | Posey et al. | 428/336 |
| 4,545,843 | 10/1985 | Bray | 156/322 |
| 4,571,363 | 2/1986 | Cubertson et al. | 428/332 |
| 4,592,953 | 6/1986 | Farrar et al. | 428/483 |
| 4,671,986 | 6/1987 | Clementini et al. | 428/216 |
| 4,695,503 | 9/1987 | Liu et al. | 428/207 |
| 4,724,186 | 2/1988 | Kelch | 428/344 |
| 4,873,137 | 10/1989 | Deyrup | 428/216 |
| 5,034,275 | 7/1991 | Pearson et al. | 428/336 |
| 5,192,620 | 3/1993 | Chu et al. | 428/461 |
| 5,215,817 | 6/1993 | Chu | 428/330 |
| 5,232,776 | 8/1993 | Lu et al. | 428/349 |
| 5,419,960 | 5/1995 | Touhsaent | 428/331 |

OTHER PUBLICATIONS

Encyclopedia of Polymer Science and Engineering, Sup Vol., pp 674–689, 1985.

*Primary Examiner*—Paul Thibodeau
*Assistant Examiner*—D. Lawrence Tarazano

[57] ABSTRACT

This invention covers a film base wherein polymers forming a polymeric film surface and selected from polyesters, polyolefins and polyamides are coated with an adhesion enhancing primer coating containing (a) a functionalized α-olefin containing copolymer; and (b) a crosslinking agent selected from the group consisting of amino formaldehyde resins, polyvalent metal salts, isocyanates, blocked isocyanates, epoxy resins and polyfunctional aziridines; and wherein the adhesion enhancing primer coating is applied to the polymeric film surface and reacted, at elevated temperatures with newly generated polymeric film surfaces formed during uniaxial or biaxial stretching and heat setting.

3 Claims, No Drawings

PRIMED POLYMER FILMS HAVING IMPROVED ADHESION CHARACTERISTICS AND PROCESSES FOR MAKING THE FILMS

FIELD OF THE INVENTION

The present invention generally relates to chemically modified base polymeric films or substrates, and more particularly to primer coatings for polymeric films which provide coated films having improved adhesion characteristics. These films may be used for a multitude of purposes including their use as food packaging films, films for supporting metallic substances or thermal transfer media inks and ink compositions.

BACKGROUND OF THE INVENTION

Polymer films or sheets, more particularly polyester films or sheets, especially those of polyethylene terephathalate (PET), are widely used in such applications as packaging, decorative articles, magnetic recording media, and photographic film. In such applications, the polyester film is printed or coated with a variety of materials, which must be applied as a uniform and continuous layer and must adhere well to the base polymer. However, PET and similar polymers do not have good receptivity to most surface-treating compositions. This problem has long been recognized in the prior art, and various methods have been developed to increase the polyester film's surface receptivity. A good discussion of the prior art in this area can be found in Posey et al., U.S. Pat. No. 4,476,189 issued Oct. 9, 1984. Nevertheless, most primers used commercially are oriented to specific end uses and are suitable only for either hydrophobic or hydrophilic surface treatment.

U.S. Pat No. 4,476,189 discloses a primed water-dispersible copolyester of terephthalic acid, an aliphatic dicarboxylic acid, and an aromatic sulfonated monomer with an alkylene glycol. The resultant primed polyester film is said to provide excellent adhesion to many subsequently applied aqueous or solvent-based coating.

The presence of the aromatic sulfonated monomer, which can be sodium sulfoterephathalic acid or a similar sulfonated derivative of a phthalic acid, is a shortcoming because such starting materials are not widely commercially available and therefore are expensive. Another potential shortcoming is that adhesion to the resultant primed polyester film can be humidity or moisture-sensitive. It is thus desirable to provide a primed polymer film or sheet which could be manufactured from inexpensive, readily available materials. It is further desireable to achieve a resultant primed polyester film to which adhesion is not humidity- or moisture-sensitive.

SUMMARY OF THE INVENTION

It has been found that application of certain primer coatings to polymer films, while in their amorphous or semi-oriented state, followed by axially or biaxially stretching these coated films at temperatures of at least 80° C. and heat setting at temperatures of at least 130° C. or higher results in improved adhesion of the primer coatings to the film base which in turn results in primed films having improved adhesion to various subsequently applied layers or coatings. Accordingly, the present invention provides for a film structure, comprising:

(i) polymers selected from the group consisting of polyesters such as polyethylene terephthalate, polyethylene napthylene; polyolefins such as polyethylene and polypropylene; and polyamides; wherein said polymers form a polymeric film surface; and (ii) an adhesion enhancing primer coating comprising:
  (a) functionalized α-olefin containing copolymers, preferably acid funtionalized α-olefin containing copolymers, selected from the group consisting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc; and
  (b) crosslinking agents selected from the group consisting of amino formaldehyde resins, polyvalent metal salts, isocyanates, blocked isocyanates, epoxy resins and polyfunctional aziridines;

wherein (ii) is applied as a primer to the polymeric film surface, preferably in its amorphous or semi-oriented state and reacted with newly generated polymeric film surfaces formed during uniaxial or biaxial stretching and heat setting. Preferably the stretching occurs at temperature of at least 80° C. This coated or primed film base has improved adhesion of (ii) to (i) which results in improved adhesion to subsequent coatings such as vacuum deposited metal; metal oxide; polyethylene; ethylene acrylic acid copolymers; ethylene vinyl acetate copolymers; ethylene vinyl acetate copolymers with various waxes or tackifiers such as glycerol esters of gum rosin, wood rosin or tall oil rosin; pentaerythritol ester of gum or wood rosin or partially hydrogenated gum or wood rosin; polyterpene resin; polyisobutylene; butadiene/styrene rubber, isobutylene/isoprene copolymer; etc,; polyvinyl alcohol; ethylene copolymers such as ethylene/methacrylate or ethylene ethyl acrylate and wax based thermal transfer media inks.

In another embodiment of the invention is described a process for preparing a film base having improved adhesion characteristics comprising the following steps:

(1) providing an amorphous polymer selected from polyesters such as polyethylene terephthalate, polyethylene napthalate; polyolefins such as polyethylene and polypropylene; and polyamides; wherein said polymer forms a polymeric film surface;

(2) applying to the polymeric film surface an adhesion enhancing primer coating comprising:
  (a) a functionalized α-olefin containing copolymer, preferably an acid functionalized α-olefin containing copolymer, selected from the group consisiting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers; propylene/acrylic acid copolymers; etc.; and
  (b) a crosslinking agent selected from the group consisting of amino formaldehyde resins, polyvalent metal salts, isocyanates, blocked isocyanates, epoxy resins and polyfunctional aziridines; and (3) drying the polymeric film surface having the applied adhesion enhancing primer coating;

(4) reacting the coating comprising (a) and (b) with the newly generated polymeric film surfaces formed during uniaxial or biaxial stretching and heat setting.

The process may further include a step (5) wherein a layer or coating selected from vacuum deposited metal, metal oxide, polyethylene, ethylene acrylic acid, ethylene vinyl acetate or copolymers thereof with waxes or tackifiers, rosins, terpene resins, polyvinyl alcohol ethylene copolymers, wax based inks, etc. is applied.

DETAILED DESCRIPTION OF THE INVENTION

The film base of the invention comprises (i) polymers selected from the group consisting of polyesters such as polyethylene terephthalate, polyethylene napthalate; polyolefins such as polyethylene or polypropylene; and polyamides; wherein said polymers form a polymeric film surface; and (ii) a specified adhesion enhacing primer coating. The coating is applied to the polymeric film surface in its amorphous or semi-oriented state, and reacted with newly generated polymeric film surfaces formed during uniaxial or biaxial stretching and heat setting.

Polymeric Film Surface

The polymeric film surface may be formed from any material capable of being formed into a sheet or film. The polymeric film surface should be capable of binding or reacting with an acid-functionalized α-olefin copolymer to form a modified film base. Some useful materials include polyester films; polyethylene and polyamides. The preferred polymeric film surface comprises polyester, most preferably polyethylene terephthalate which may be biaxially oriented after or during the application of the specified coating.

Useful polyester films may be manufactured from various types of thermoplastic polyester resins, such as polyethylene terephthalate, polytetramethylene terephthalate, polyethylene-2,6-naphthalate, poly-1,4-cyclohexylene dimethyl terephthalate, etc. Polyester copolymers may also be used such as polyethylene terephthalate/isophthalate, polyethylene terephthalate/adipate, polyethylene terephthalate/sebacate, polyethylene terephthalate/sulfoisophthalate, polyethylene terephthalate/azelate, etc.

Polymeric films used the practice of this invention may have a thickness of 1 to 500 microns, preferably 10 to 350 microns.

Adhesion Enhancing Primer Coating

The coating comprises a functionalized α-olefin containing copolymer, preferably an acid functionalized α-olefin containing copolymer, and a crosslinking agent selected from the group consisting of amino formaldehyde resins, polyvalent metal salts, isocyanates, blocked isocyanates, epoxy resins and polyfunctional aziridines. Other components such as coating aids, antistatic agents, slip agents, fungicides, etc. may be present in the coating composition. This coating may have a thickness of 0.01 to 10 microns, preferably 0.02 to 1 microns.

Functionalized α-Olefin Containing Copolymer

Some suitable α-olefins include ethylene, propylene, butene-1 and mixtures thereof or mixtures of these α-olefins with higher α-olefins such as hexene-1, octene-1 and/or decene-1. Some exemplary functional groups include preferably unsaturated carboxylic acids such as acrylic acid, methacrylic acid, itaconic acid, fumaric acid, crotonic acid, etc., and other functionalizing monomers such as methacrylamide, glycidyl methacrylate, dimethylaminoethyl methacrylate, 2-hydroxyethylacrylate, etc. The preferred copolymers used in this invention may have about 60 to 99.9 weight %, preferably 70 to 99 weight %, of the α-olefin containing component and 0.1 to 40 weight %, preferably 1 to 30 weight %, of the unsaturated carboxylic acid. The ratio of the α-olefin to the unsaturated carboxylic acid should be determined by considering the desired properties for the copolymer. The copolymer must assist in enhancing the adhesiveness of the primer coated polymeric film surface to subsequently applied coatings and should also be compatible with any other components present in the coating formulation.

The copolymers may have a sufficient number of their acid groups neutralized. Some suitable salts include sodium, magnesium, ammonium and zinc salts, etc.

The functionalized α-olefin containing copolymer may be selected from the group consisiting of ethylene/acrylic acid copolymers; ethylene/methacrylic acid copolymers; ethylene/vinylacetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers and propylene/acrylic acid copolymers. Preferably the functionalized α-olefin containing copolymer is an ethylene/acrylic acid copolymer which may or may not be neutralized and which is commercially available. Some commercially available functionalized α-olefin containing copolymers are sold under the trade names Surlyn® and Primacor®.

The functionalized α-olefin containing copolymer may be present in the amount of 30 to 99.9 weight %, preferably 70 to 99 weight %, based on the total weight of the additive free coating solids.

Crosslinking Agents

The crosslinking agent present in the coating may be selected from the group consisting of amino formaldehyde resins, polyvalent metal salts, isocyanates, blocked isocyanates, epoxy resins and polyfunctional aziridines. Some preferred crosslinking agents include Cymel® 301, Cymel® 350 (aminoformaldehydes) and Ionac PFAZ-322 (polyfunctional aziridine). The crosslinking agent is present in the amount of 0.1 to 70 weight %, preferably 1 to 30 weight %, based on the total weight of the additive-free coating solids.

Additives

Additives such as coating aids, wetting aids such as surfactants, slip additives, antistatic agents can be incorporated in levels from 0 to 50% based on the total weight of additive-free coating solids.

Top Coats

The film base of the invention may be coated with a subsequent coating or layer (iii), wherein layer (iii) is in contact with layer (ii) on its surface away from layer (i). The subsequent coating that is applied to the film base of the invention may be selected from the group consisting of a vacuum deposited metal; metal oxide; polyethylene; ethylene acrylic acid copolymers; ethylene vinyl acetate copolymers; ethylene vinyl acetate copolymers with various waxes or tackifiers such as glycerol esters of gum rosin, wood rosin or tall oil rosin; pentaerythritol ester of gum or wood rosin, or partially hydrogenated gum or wood rosin; polyterpene resin; polyisobutylene; butadiene/styrene rubber, isobutylene/isoprene copolymer; etc.; polyvinyl alcohol; ethylene copolymers such as ethylene/methacrylate or ethylene ethyl acrylate and wax based thermal transfer media inks.

Process of Manufacture

The polymer films of the present invention can be manufactured by an extrusion process, such as a cast film or blown film process. In a cast film process, the polymer resin is first heated to a molten state and then extruded through a wide slot die in the form of an amorphous sheet. The sheet-like extrudate is rapidly cooled or "quenched" to form a cast sheet of polyester by contacting and traveling partially around a polished, revolving casting drum.

Alternatively, the extrudate can be blown in a conventional blown film process. Regardless of the process however, the polyester sheet is preferably uniaxially or biaxially (preferably biaxially) stretched in the direction of film travel (machine direction) and/or perpendicular to the machine direction (traverse direction), while being heated to a temperature in the range of from about 80° C. to 160° C., preferably about 90° C. to 110° C. the degree of stretching may range from 3.0 to 5.0 times the original cast sheet unit dimension, preferably from about 3.2 to about 4.2 times the original cast sheet dimension. Reaction with the newly generated polymer film surfaces formed during stretching preferably occurs at temperatures about 130° C. or higher.

The adhesion enhancing coating layer (ii) is preferably applied to the polymeric film surface by conventional coating techniques. Prior to coating the polymeric film surface, the film may be surface-treated in any conventional manner, depending upon the particular application and performance required from the final product.

Electric corona discharge is a conventional surface treatment which is commonly performed on polymer films, especially polyester films, to enhance the film's surface qualities, especially its adhesive and printing properties. Electric corona discharge methods and apparatus are described in U.S. Pat. Nos. 3,057,792 and 4,239,973.

The films may be subjected to corona treatment followed by application of the coating during the in-line manufacturing process. Drying of the coating may be accomplished before or during stretching.

The polymeric film surface can be coated with the primer coating specified herein using any of the well known coating techniques. For example, the film surface may be coated by roller coating, spray coating, gravure coating, slot coating, or extrusion coating preferably gravure or roller coating. The solvent is then removed (dried). Alternatively, the coating may be applied in dry form to give or ultimately give a coated film according to the invention without requiring drying or solvent removal. The heat applied to the film during the subsequent preheating, stretching, and heat-setting stages is generally sufficient to evaporate the coating solvent. Stretching of the film occurs at temperatures of at least 80° C.

The coated, oriented polymeric film may then be heat treated for a period of time necessary to crystallize the film (e.g., heat setting). Crystallization imparts dimensional stability and good tensile properties to the polymer film. Oriented polymer film may be heat set at a temperature ranging from 130° C. to 240° C., preferably from 180° C. to 235° C., more preferably from 215° C. to 235° C. During this step the coating components in (ii) may additionally react with newly generated polymeric film surfaces (i) to give a film base that has improved adhesion of the primer coating (ii) to the polymeric film surface (i), and in turn provides improved adhesion of subsequently applied topcoat coatings (iii) to layer (ii) on its surface away from (i). The coated crystalline, oriented polymer film is generally then wound onto a roll.

The subsequent topcoat coatings or layers may be applied by techniques known to one skilled in the art.

EXAMPLES

The invention will now be illustrated by, but not limited to, the following examples, in which parts and percentages are by weight unless otherwise noted.

| GLOSSARY: | |
|---|---|
| Adcote ® 56220 | 30% solids emulsion of Surlyn ® 56220, Morton International Inc., Chicago, IL. |
| Adcote ® 50C12 | 22% solids emulsion of an ethylene acrylic acid polymer, Morton International Inc., Chicago, IL. |
| Adcote ® 50T4983 | 25% solids emulsion of Dow's Primacor ® 5980 ethylene acrylic acid resin, Morton International Inc., Chicago, IL. |
| Adcote ® 50T4990 | 35% solids emulsion of Dow's Primacor ® 5990 ethylene acrylic acid resin, Morton International Inc., Chicago, IL. |
| Michem Prime ® 4983 | 25% solids emulsion of Dow's Primacor ® 5980 ethylene acrylic acid resin, Michelman, Inc., Cincinnati, OH. |

| INGREDIENT | AMOUNT (GM) |
|---|---|
| Crosslinking Agent Solution A: | |
| Cymel ® 301, American Cyanamid Co., Stamford, CT | 158.25 |
| Standapol ® A, Henkel Corp., La Grange, Il. | 479.50 |
| Aerosol ® OT-75, American Cyanamid | 87.90 |
| Isopropanol | 1319.00 |
| Concentrated ammonium hydroxide | 182.00 |
| Ammonium sulfate | 7.91 |
| Distilled water | 1265.44 |
| Crosslinking Agent Solution B: | |
| Cymel ® 301, American Cyanamid Co., Stamford, CT. | 1695.00 |
| Isoprppanol | 590.00 |
| Dimethyl aminoethanol | 221.00 |
| Ammonium sulfate | 84.75 |
| Distilled water | 1159.25 |
| Crosslinking Agent Solution C: | |
| PFAZ-322, Sybron Chemical Inc., Birmingham, NY | 188.4 |
| Isopropanol | 104.0 |
| Distilled water | 207.6 |

The following adhesion enhancing coating solutions were prepared:

| COATING SOLN # | INGREDIENTS | AMOUNT (GM) |
|---|---|---|
| 1 (Control) | Adcote ® 56220 | 1256.00 |
| | Distilled water | 2512.00 |
| 2 | Adcote ® 56220 | 1256.00 |
| | Crosslinking Agent solution A | 83.30 |
| | Distilled water | 2428.70 |
| 3 | Adcote ® 56220 | 1256.00 |
| | Crosslinking Agent solution A | 83.30 |
| | Crosslinking Agent solution B | 10.00 |
| | Distilled water | 2418.70 |
| 4 | Adcote ® 56220 | 1256.00 |
| | Crosslinking Agent solution C | 10.00 |

-continued

| COATING SOLN # | INGREDIENTS | AMOUNT (GM) |
|---|---|---|
| | Distilled water | 2502.00 |
| 5 | Adcote ® 56220 | 1256.00 |
| | Crosslinking Agent solution C | 20.00 |
| | Distilled water | 2492.00 |
| 5a | Adcote ® 56220 | 1256.00 |
| | Crosslinking Agent solution C | 40.00 |
| | Distilled water | 2472.00 |
| 6 (Control) | Adcote ® 50C12 | 1713.00 |
| | Distilled water | 2055.00 |
| 7 | Adcote ® 50C12 | 1713.00 |
| | Crosslinking Agent solution A | 83.30 |
| | Distilled water | 1971.70 |
| 8 | Adcote ® 50C12 | 1713.00 |
| | Crosslinking Agent solution A | 83.30 |
| | Crosslinking Agent solution B | 10.00 |
| | Distilled water | 1961.70 |
| 9 | Adcote ® 50C12 | 1713.00 |
| | Crosslinking Agent solution C | 10.00 |
| | Distilled water | 2045.00 |
| 10 | Adcote ® 50C12 | 1713.00 |
| | Crosslinking Agent solution C | 20.00 |
| | Distilled water | 2035.00 |
| 11 (Control) | Adcote ® 50T4983 | 1507.00 |
| | Distilled water | 2261.00 |
| 12 | Adcote ® 50T4983 | 1507.00 |
| | Crosslinking Agent solution C | 10.00 |
| | Distilled water | 2251.00 |
| 13 | Adcote ® 50T4983 | 1507.00 |
| | Crosslinking Agent solution C | 20.00 |
| | Distilled water | 2241.00 |
| 14 (Control) | Adcote ® 50T4990 | 1077.00 |
| | Distilled water | 2691.00 |
| 15 | Adcote ® 50T4990 | 1077.00 |
| | Crosslinking Agent solution A | 83.30 |
| | Distilled water | 2607.70 |
| 16 | Adcote ® 50T4990 | 1077.00 |
| | Crosslinking Agent solution A | 83.38 |
| | Crosslinking Agent solution B | 10.00 |
| | Distilled water | 2597.70 |
| 17 | Adcote ® 50T4990 | 1077.00 |
| | Crosslinking Agent solution C | 10.00 |
| | Distilled water | 2681.00 |
| 18 | Adcote ® 50T4990 | 1077.00 |
| | Crosslinking Agent solution C | 20.00 |
| | Distilled water | 2671.00 |
| 19 (Control) | Michein Prime ® 4983 | 1507.00 |
| | Distilled water | 2261.00 |
| 19a (Control) | Michem Prime ® 4983 | 3768.00 |
| 20 | Michem Prime ® 4983 | 1507.00 |
| | Crosslinking Agent solution A | 83.30 |
| | Distilled water | 2177.70 |
| 21 | Michem Prime ® 4983 | 1507.00 |
| | Crosslinking Agent solution A | 83.30 |
| | Crosslinking Agent solution B | 10.00 |
| | Distilled water | 2167.70 |
| 22 | Michem Prime ® 4983 | 3696.00 |
| | Crosslinking Agent solution B | 40.00 |
| | Distilled water | 32.00 |
| 23 | Michem Prime ® 4983 | 3624.00 |
| | Crosslinking Agent solution B | 80.00 |
| | Distilled water | 64.00 |
| 24 | Michem Prime ® 4983 | 1507.00 |
| | Crosslinking Agent solution C | 10.00 |
| | Distilled water | 2251.00 |
| 25 | Michem Prime ® 4983 | 1507.00 |
| | Crosslinking Agent solution C | 20.00 |
| | Distilled water | 2241.00 |
| 26 (Comparative Example) | Michem Prime ® 4983 | 3624.0 |
| | Crosslinking Agent solution B | 80.0 |
| | Distilled water | 64.0 |

All coatings except for sample #26 were applied to cast film via in-line gravure roll coating. The coatings were dried at a temperature of 80° C. after which the cast film was biaxially stretched to 3.3×3.3 times its original size. The coated, dried and stretched film was heat set at 210° C. to form primed film samples 1–25. Sample #26 coating was applied to a polyester film which was previously biaxially oriented and heat set (prior to applying the #2 coating). The coated film then was dried at 130° C. to form primed film sample #26. The dried films of all examples with the exception of 19a, 22, 23 and 26, had a coating weight of 0.07 g/M$^2$. Samples 19a, 22, 23 and 26 had a coating weight of 0.3 g/M$^2$.

The primed films were heat sealed as follows:

Heat Seal

A. Treated side of Primacor® 899 backed with Al foil, Dow Chemical, U.S.A., Midland, Mich.

B. Untreated side of Primacor® 899 backed with Al foil

C. GBC type P/N 30000 laminating film, General Binding Corporation, Addison, Ill.

D. 2 mil thick Elvax® 3182 film backed with 2.5 mil (56.25 micron) thick red #650 cellophane tape from 3M, Minneapolis, Minn., wherein Elvax® 3182 is an ethylene/vinyl acetate copolymer having 28 weight % of vinyl acetate, manufactured by E. I. DuPont de Nemours and Company, Wilmington, Del.

The heat sealing for heat seals A, B, and C was done using a Sentinel model 12-ASL heat sealer manufactured by Sencorp Systems Inc., Hyannis, Mass. Heat sealing conditions were 50 psi, 250° F. for 5 seconds. The heat sealing for heat seal D was done using a Sentinel model 12ASL/1. Heat sealing conditions were 30 psi (jaw pressure), 300° F. (148.9° C.) for 5 seconds.

180 degree peels were run for heat seals A, B and C using a Suter peel tester (manufactured by Alfred Suter, Co., New York, N.Y.) with 12 in/min peel rate. The primed film side of the heat sealed sample was fastened to a metal support plate insert in the top jaw. The heat seal layer side was folded back on itself and inserted into the bottom jaw. For heat seal D, 90° peels were run using a Suter peel tester at 12 inches/min. peel rate. The primed film side of the heat sealed sample was inserted into the top jaw. The red tape backed Elvax® 3182 side was inserted into the bottom jaw.

The higher the value of the heat seal the better adhesion. The numerical values range from 0 gms/in (no adhesion) to greater than 4000 gms/in (significant adhesion). The preferred values for good primer coating adhesion range from 1000 to 4000 gms/in.

| | Peel Strengths (gms/in) | | | |
|---|---|---|---|---|
| Sample # | Heat Seal A | Heat Seal B | Heat Seal C | Heat Seal D |
| 1$^y$ | 300 | 700 | 1500 | 0 |
| 2 | 500 | 500 | 2000 | 0 |
| 3 | 600 | 500 | 2000 | 0 |
| 4 | 1300 | 1300 | 1500 | 0 |
| 5 | 1100 | 1400 | 2000 | 2600$^x$ |
| 5a | 2000 | 2500 | 4000 | 2700$^x$ |
| 6$^y$ | 200 | 150 | | 0 |
| 7 | 1500 | 1100 | | 2100$^x$ |
| 8 | 3000 | 3000 | | 2700$^x$ |
| 9 | 800 | 700 | | 200 |
| 10 | 1500 | 1200 | | 400 |
| 11$^y$ | 200 | 200 | | 0 |
| 12 | 1000 | 700 | | 0 |
| 13 | 1000 | 900 | | 0 |
| 14$^y$ | 200 | 200 | | 0 |
| 15 | 1200 | 1000 | | 0 |
| 16 | 3500 | 3000 | | 2500$^x$ |
| 17 | 700 | 500 | | 200 |
| 18 | 1100 | 1000 | | 0 |

-continued

| Peel Strengths (gms/in) | | | | |
|---|---|---|---|---|
| Sample # | Heat Seal A | Heat Seal B | Heat Seal C | Heat Seal D |
| 19[y] | 200 | 200 | | 0 |
| 19a[y] | | | | 80 |
| 20 | 1700 | 1700 | | 1800 |
| 21 | 3000 | 1800 | | 2700[x] |
| 22 | | | | 60 |
| 23 | | | | 2600[x] |
| 24 | 1100 | 1000 | | 0 |
| 25 | 1200 | 1000 | | 0 |
| 26[z] | | | | 0 |

[x]In cases where the heat seal D exceeded 2000 g/m, there was always internal cohesive failure within the Elvax ® 3182 film layer before any adhesion disruption between layers.
[y]Control examples - These examples use no crosslinking agent in the coating solution.
[z]Comparative example - This example used the identical coating composition that was applied to the film in Example 23. The results clearly demonstrate that improved adhesion occurs when the coating solution is applied prior to or during stretching under the conditions specified herein. The data also shows that a crosslinking agent is necessary to affect the adhesion.

What is claimed is:

1. A coated, uniaxially or biaxially stretched film base comprising:
   (i) a polyester polymer, wherein said polymer forms a polymeric film surface;
   (ii) an adhesion enhancing primer coating having a thickness of from 0.02 to 1 micron consisting essentially of:
       (a) a functionalized -olefin containing copolymer selected from the group consisting of ethylene/acrylic acid copolymers; ethylene/methacrylic acid copolymers; ethylene/vinyl acetate/acrylic acid terpolymers; ethylene/methacrylamide copolymers; ethylene/glycidyl methacrylate copolymers; ethylene/dimethylaminoethyl methacrylate copolymers; ethylene/2-hydroxyethyl acrylate copolymers and propylene/acrylic acid copolymers; and
       (b) a cross-linking agent selected from the group consisting of amino formaldehyde resins, polyvalent metal salts, isocyanates, blocked isocyanates, epoxy resins and polyfunctional aziridines; wherein said primer coating (ii) is applied to the polymeric film surface, followed by drying the coating on the polymeric film surface and uniaxially or biaxially stretching and heat-setting the coated polymeric film; and
   (iii) a layer or coating selected from the group consisting of a vacuum deposited metal; metal oxide; polyethylene; ethylene acrylic acid copolymers; ethylene vinyl acetate copolymers; ethylene vinyl acetate copolymers with various waxes or tackifiers; polyvinyl alcohol; ethylene copolymers and wax thermal transfer media inks; wherein layer (iii) is in contact with layer (ii) on its surface away from layer (i).

2. The film base of claim 1 wherein the tackifiers are selected from the group consisting of glycerol esters of gum rosin, wood rosin or tall oil rosin, pentaerythritol ester of gum rosin; pentaerythritol ester of wood rosin, pentaerythritol ester of partially hydrogenated gum rosin; pentaerythritol ester of partially hydrogenated wood rosin; polyterpene resin; polyisobutylene; butadiene/styrene rubber, and isobutylene/isoprene copolymer.

3. The film base of claim 1 wherein the funtionalized α-olefin containing copolymer is an acid funtionalized α-olefin containing copolymers.

* * * * *